Figure 1:
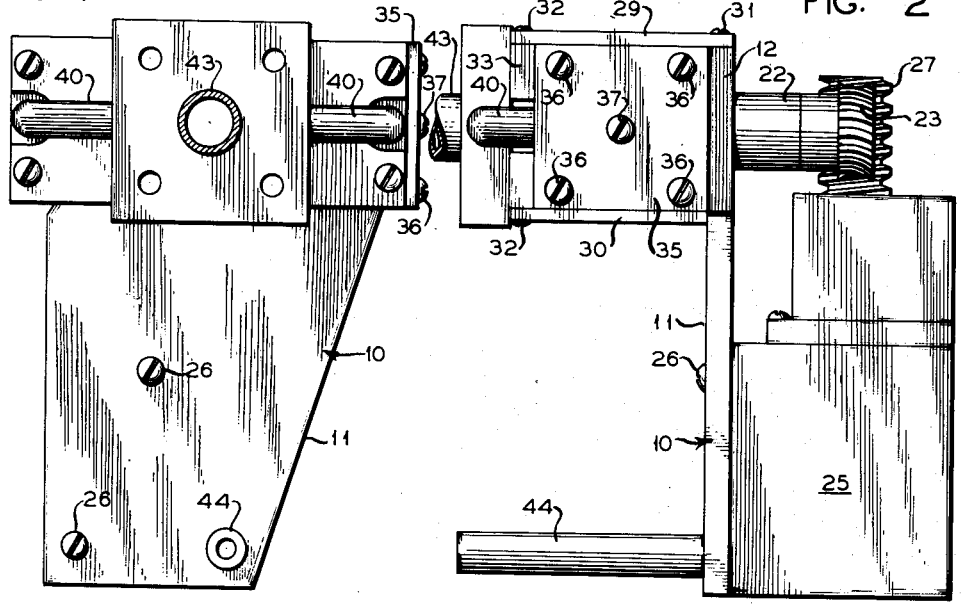

July 5, 1955

R. J. HAVENS 2,712,239

PRESSURE DETERMINATION DEVICE

Filed Aug. 4, 1949

INVENTOR.
R. J. HAVENS
BY

2,712,239
PRESSURE DETERMINATION DEVICE

Ralph J. Havens, Arlington, Va.

Application August 4, 1949, Serial No. 108,627

10 Claims. (Cl. 73—399)

(Granted under Title 35, U. S. Code (1952), sec. 266)

This invention relates to pressure responsive devices and more particularly to a device for measuring or indicating extremely low pressures with a high degree of accuracy and minimum time lag and for providing an electrical potential the value of which is proportional to the pressure and which also may be utilized to control such pressure.

Heretofore, many devices of this nature have been developed and utilized but in the majority of these devices numerous disadvantages were present such as inaccuracy of indication, excessive time lag when attempting to measure rapidly varying pressures, extreme complexity resulting in high maintenance cost as well as relatively high first cost, and inability to properly indicate extremely low pressures of the order of $10^{-10}$ mm. of Hg.

A great many industrial processes utilize a vacuum at one or more stages therein and in the majority of cases it is highly important that a constant indication of the vacuum maintained be available and it is also highly important that this vacuum be automatically maintained within relatively close limits. The device of this invention is particularly well adapted for application in these industrial processes in that the device combines relatively low first cost with a high degree of accuracy and reliability and is as well adapted to control vacuum or pressure conditions as it is to visually indicate the same. Likewise, the device of this invention is well adapted for use as expendable or recoverable equipment in altitude sounding devices or for indicating either graphically or by a transmitted radio signal the pressures encountered by rockets or other projectiles travelling through space and since the device may be of relatively rugged construction the shock and vibration incident to such uses is not a serious factor in the operation and utilization thereof.

Briefly stated, the invention utilizes the basic principle that the resistance of a conductor carrying an electric current will be varied in proportion to a variation in the gaseous or vapor pressure to which the conductor is subjected. This phenomenon is due to the fact that at lower pressures the dissipation of heat developed by the passage of an electric current through the conductor will vary with a variation in the fluid pressure surrounding such conductor since the heat conductivity of the fluid surrounding the conductor will be varied by such variation in pressure.

At higher pressures under cyclic compression, the temperature of the conductor, and consequently its resistance, increases when the gas gives up heat under compression and decreases when the gas expands. The temperature change of the conductor is then a function of the mass of gas surrounding the conductor, and hence of the average pressure.

Since it is well-known that the conductivity of a conductor is proportional to the temperature thereof this property may be conveniently utilized in the present invention to convert the gaseous or vapor pressure to electrical units, the value of which would be a function of such fluid pressure and since it is desired to obtain a very accurate reading of this pressure, such a system is highly desirable in that the resultant electrical indication may be amplified for indicating purposes so that a relatively large deviation of an indicating instrument may be obtained in response to relatively small changes in the pressure to be measured. Likewise, the electric potential constituting a function of the pressure may be conveniently utilized to control pressure conditions in manufacturing processes or the like.

While simply subjecting the conductor to the pressure to be measured would theoretically produce the desired result, as a practical matter, such a solution of the problem is not suitable in that the variation in resistance of the conductor in response to a minute variation in pressure would be so small with relation to the changes in resistance resulting from changes in ambient temperature and also changes in the radiation characteristics of the atmosphere surrounding the device that accurate results would be extremely difficult to obtain.

It is therefore proposed to provide means for varying the pressure on said conductor between predetermined limits and at a predetermined frequncy independently of the pressure to be measured. Such a cycling of the pressure produces a relatively great change in the resistance of the conductor compared to the change produced thereon by variations in ambient temperature or changes in radiation characteristics of the atmosphere surrounding the device, and consequently, will provide an indication accurately reflecting the pressure conditions at the pressure source which indication will not be appreciably affected by changes in conditions to which the device may be subjected. The change in pressure during cycling thereof may be approximately ten per cent of the pressure to be measured and consequently the average value of the electrical potential produced by such a change in temperature would be proportional to the pressure to be measured.

It is therefore an object of this invention to provide a pressure responsive device in which an electrical potential is produced, the value of which is proportional to the pressure.

Another object of this invention is to provide a pressure responsive device in which a modulated alternating current potential is produced the value of which is proportional to the pressure.

It is a further object of this invention to provide a pressure responsive device in which an electrical potential is produced, the value of which is proportional to the pressure, which electrical potential may be utilized for providing a visual indication of the pressure or for controlling such pressure.

It is a further object of the invention to provide a pressure responsive device in which an electrical conductor is disposed in a chamber communicating with a source of pressure, the pressure in the chamber being varied through predetermined limits independently of the pressure source thereby varying the conductivity of the conductor whereby an electrical potential impressed upon the conductor will be varied to produce a modulated alternating current potential the value of which is proportional to the pressure at the source.

It is a further object of the invention to provide a pressure responsive device in which a modulated electric potential proportional to the pressure is produced and which potential may be amplified to facilitate the indication of extremely low pressures or relatively small changes in pressure.

It is a still further object of the invention to provide a pressure responsive device which is responsive to a plurality of pressure conditions and which may be maintained substantially in static and dynamic balance.

It is a further object of this invention to provide a pressure responsive device which is relatively simple and which may be manufactured from readily available materials not requiring highly skilled labor and the maintenance of extremely close tolerances, thus providing an extremely sensitive and accurate scientific instrument which may be produced at a relatively low cost.

Figure 2:
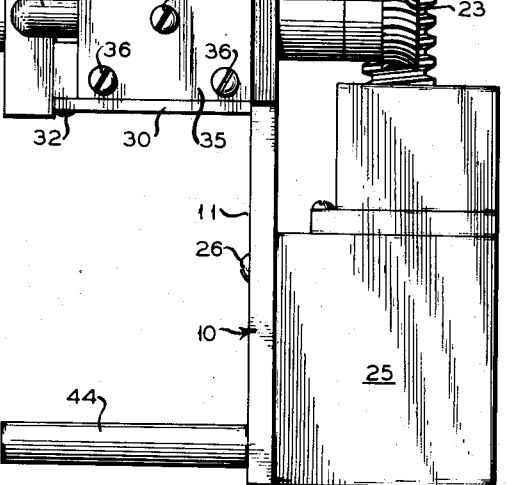
Figure 3:
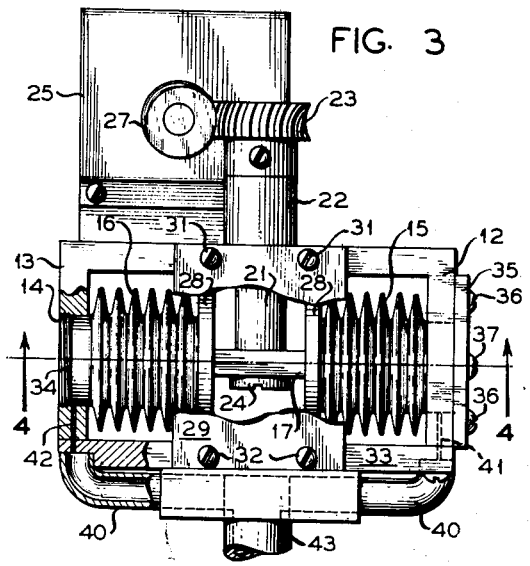
Figure 4:
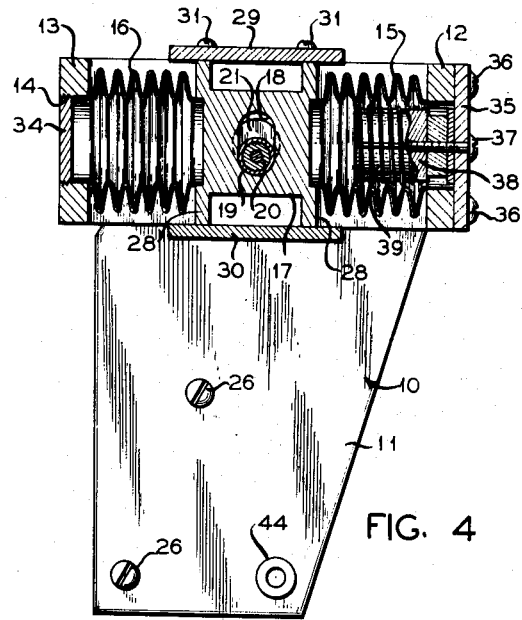
Figure 5:
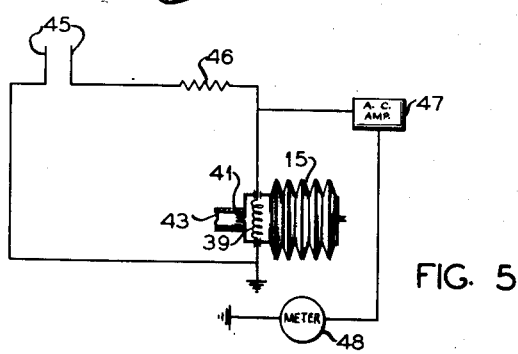

Further advantages and objects of the present invention will become apparent from a consideration of the following specification taken in conjunction with the drawings, wherein:

Fig. 1 is a front elevational view of the pressure responsive device of this invention;

Fig. 2, a side elevation of the device shown in Fig. 1;

Fig. 3, a plan view of the device shown in Fig. 1 with parts in section for greater clarity;

Fig. 4, a vertical sectional view on the line 4—4 of Fig. 3; and,

Fig. 5, a diagrammatic view of the pressure responsive device of this invention utilized as a pressure measuring device.

With continued reference to the drawings, there is shown a frame 10 comprising a base plate 11 having adjacent one end thereof arms 12 and 13 projecting substantially at right angles thereto. Arms 12 and 13 provide opposed substantially parallel supporting members to which may be attached by interengaging screw threads or the like 14 a pair of bellows 15 and 16 the inner ends of which are closed by an actuating member 17. Actuating member 17 is provided with a substantially centrally located slot 18 in which is positioned a bushing 19 rotatably mounted on an eccentrically disposed portion 20 of a drive shaft 21. Drive shaft 21 is journalled for rotation in a bearing 22 secured to the plate 11, shaft 21 having secured thereto at its end remote from the bushing 19 a worm wheel 23, the bushing 19 being secured against displacement by screw threaded means or the like 24.

In order to drive shaft 21 there is provided an electric motor 25 secured to the plate 11 by screw threaded fastening means or the like 26, which motor is provided with a worm 27 drivingly engaging worm wheel 23. Motor 25 may be of any desired size or type and may conveniently comprise a miniature, relatively high speed, lightweight D. C. motor which is ample for the purpose since the power required therefrom is relatively small. As will be seen from an inspection of the drawings, rotation of the motor 25 will serve to rotate the shaft 21 and bushing 19 thus imparting a reciprocating movement to actuating member 17 whereby bellows 15 and 16 are compressed and expanded in an axial direction to increase and decrease the pressure therein.

In order to prevent side thrust on the bellows 16 and 15 and to restrain movement of actuating member 17 to substantially a straight line, member 17 is provided with flanges 28 adjacent the point of attachment to the bellows 15 and 16, these flanges slidably engaging the inner surfaces of upper plate 29 and lower plate 30. Plates 29 and 30 are secured to frame 10 by screw threaded fasteners or the like 31 and are likewise secured by screw threaded fasteners or the like 32 to a cross bar 33 connecting the outer ends of arms 12 and 13.

Bellows 16 is closed at the outer end thereof by a plate 34 and bellows 15 is closed by a plate 35 secured to arm 12 by screw threaded fasteners or the like 36. Mounted on the plate 35 by screw threaded means or the like 37 is a spool like member 38 which is disposed within bellows 15. Member 38 may be of any desired size or configuration and serves to receive and support a conductor in the form of a resistance wire or element 39, there being leads from each end of this wire through pressure tight connections to the exterior of the bellows 15. Normally, however, only one resistance element will be utilized, the bellows 16 and associated structure being provided mainly for the purpose of balancing the bellows 15, thereby maintaining the device substantially in static and dynamic balance.

Bellows 15 and 16 communicate with a manifold or other fluid conduit 40 through restricted openings or orifices 41 and 42 and on manifold 40 which connects with a source of pressure to be measured through a conduit 43. The size of orifices 41 and 42 is such that flow of fluid therethrough is retarded to such an extent that during expansion and contraction of the bellows through one cycle there will be substantially no flow of fluid through such orifices, the rate of flow, however, being sufficient to insure that the average pressure within the bellows 15 and 16 will be substantially the same as that at the pressure source to be measured and will change with sufficient rapidity to reflect changes in pressure normally encountered at the pressure source.

The movement of bellows 15 and 16 under the action of actuating member 17 which is reciprocated by motor 25 is such that the change of pressure therein is approximately 10% of the pressure at the pressure source to be measured. Consequently, assuming the pressure to be measured as 760 mm. of Hg, the change in pressure within the bellows would be approximately 76 mm. of Hg whereas if the pressure at the source were 1 mm. of Hg the pressure change within the bellows would be approximately 1/10 mm. of Hg.

In order to facilitate mounting of the device on an instrument panel, tank or any other desired supporting means, a stud 44 is secured to the plate 11 and this stud together with the conduit 43 serves to secure the device in position.

In Fig. 5 there is shown in diagrammatic form a circuit for utilizing the apparatus of this invention for measuring and visually indicating the pressure in any desired pressure source and as shown therein there is provided a source of electrical potential 45 which may be of the A. C. or D. C. variety and relatively constant, this source of potential being connected through a resistor 46 to resistance element 39 disposed within bellows 15, the opposite end of element 39 being connected to the opposite side of the electrical source 45. The input of A. C. amplifier 47 is connected between resistor 46 and resistance element 39, the output of amplifier 47 being connected to a meter 48 which may be calibrated in terms of pressure or may read in electrical units which are subsequently converted to pressure units.

During operation of the device the pressure to be measured is connected to the bellows 15 through conduit 13 and orifice 41 thereby subjecting resistance element 39 to such pressure. Motor 25 is energized and serves to expand and contract the bellows 15, thus increasing and decreasing the pressure therein a predetermined amount and at a predetermined frequency, this frequency being from 5 cycles per second to 100 cycles per second, depending upon the conditions encountered. This cycling of the pressure within the bellows 15 serves to increase and decrease the conductivity of resistance element 39 resulting in producing a modulated alternating current potential therein, the average value of which is proportional to the average pressure within the bellows. This modulated potential is then amplified by the amplifier 47 in order to obtain a maximum deviation of the meter 48 thereby providing an extremely accurate indication of the pressure to be measured. Where pressures of a reltaively high order are to be measured, it is not necessary to utilize the amplifier 47 since the value of the modulated potential will be sufficient to provide an adequate deviation of the meter 48.

In utilizing the device to control pressure conditions the modulated potential resulting from expansion and contraction of the bellows 15 could be connected directly, or the output of amplifier 47 could be connected to any desired control mechanism which in turn could control the operation of vacuum producing machinery or such valves as were necessary to accurately control the pressure conditions during a manufacturing process or within any desired space.

It will be obvious to those skilled in the art that various changes may be made in the invention without departing from the spirit and scope thereof and therefore the invention is not limited by that which is shown in the drawings and described in the specification but only as indicated in the appended claims.

The invention herein described may be manufactured and used by or for the Government of the United States of America for governmental purposes without payment of any royalities thereon or therefor.

What is claimed is:

1. A voltage modulating gas pressure responsive device comprising an expansible and a contractible chamber, a restricted orifice communicating with said chamber and adapted to communicate with a pressure source, an electrical conductor disposed in said chamber, an electrical source connected to said conductor for impressing a substantially constant potential thereon, means for continuously expanding and contracting said chamber a predetermined amount and at a predetermined frequency, the resulting change in pressure within said chamber varying the conductivity of said conductor, thereby producing a modulating alternating current potential therein the average value of which is proportional to the pressure at said pressure source, an amplifier connected to said conductor for amplifying said modulated alternating current potential and indicator means connected to said amplifier for indicating the pressure at said pressure source.

2. A voltage modulating gas pressure responsive measuring device comprising an expansible and contractible chamber, a restricted orifice communicating with said chamber and adapted to communicate with a pressure source, an electrical conductor disposed in said chamber, an electrical source connected to said conductor for impressing substantially constant potential thereon, means for continuously expanding and contracting said chamber a predetermined amount and at a predetermined frequency, the resulting change in pressure within said chamber varying the conductivity of said conductor thereby producing a modulated alternating current potential therein the average value of which is proportional to the pressure at said pressure source, and indicator means connected to said conductor for indicating the pressure at said pressure source.

3. A voltage modulating gas pressure responsive device comprising an expansible and contractible chamber, means for restricting the flow of gas between a gas pressure source and said chamber, an electrical conductor disposed in said chamber, an electrical source connected to said conductor for impressing a substantially constant potential thereon, means for continuously expanding and contracting said chamber a predetermined amount and at a predetermined frequency, the resulting change in pressure within said chamber varying the conductivity of said conductor thereby producing a modulated alternating current potential therein the average value of which is proportional to the pressure at said pressure source.

4. A voltage modulating gas pressure responsive device comprising an expansible and contractible chamber, means for connecting said chamber and a gas pressure source and for restricting the flow of gas therebetween, an electrical conductor disposed in said chamber, an electrical source connected to said conductor for impressing a potential thereon, means for continuously expanding and contracting said chamber a predetermined amount and at a predetermined frequency, the resulting change in pressure within said chamber varying the conductivity of said conductor thereby producing a modulated alternating current potential therein the value of which is proportional to the pressure at said pressure source.

5. A voltage modulating gas pressure responsive measuring device comprising a chamber adapted for communicating with a source of pressure to be measured, means for restricting gas flow between said source and said chamber, an electrical conductor disposed in said chamber, means for impressing an electrical potential on said conductor, means for continuously varying the pressure in said chamber independently of said pressure source and between predetermined limits, the resulting change in pressure in said chamber varying the conductivity of said conductor and thereby producing a modulated alternating current potential therein, means for amplifying said alternating current potential, and means for indicating said amplified potential as a function of the pressure at said pressure source.

6. A device as defined in claim 1 in which said expansible and contractible chamber comprises a bellows.

7. A device as defined in claim 1 in which the means for continuously expanding and contracting said chamber comprises a motor driven cam.

8. A device as defined in claim 1 in which a second expansible and contractible chamber is connected with said pressure source and is expanded and contracted by the means for expanding and contracting said first chamber whereby said device is substantially in static and dynamic balance.

9. In combination, a variable volume gas chamber, gas flow restricting means connectible with a source of gas pressure and communicating with the chamber operatively to isolate the source effectively from the chamber during short time pressure variations in the latter, continuously operable chamber actuator means connected to the chamber and cyclically operative to vary the chamber volume recurrently over a selected range, gas sensitive means responsive to gas pressure within the chamber, and long time constant indicator means connected with the gas sensitive means operative responsively thereto over multiple cycles of the chamber actuator means.

10. In combination, a variable volume gas pressure chamber containing a gas under pressure, continuously operable chamber actuator means connected to the chamber and cyclically operative to vary the chamber volume recurrently over a selected range, gas sensitive means responsive to gas pressure within the chamber, and long time constant indicator means connected with the gas sensitive means operative responsively thereto over multiple cycles of the chamber actuator means.

References Cited in the file of this patent

UNITED STATES PATENTS

| | | |
|---|---|---|
| 1,557,710 | Lennon | Oct. 20, 1925 |
| 2,202,900 | Draper | June 4, 1940 |
| 2,324,340 | Walker et al. | July 13, 1943 |
| 2,358,467 | Minter | Sept. 19, 1944 |
| 2,460,873 | Clewell et al. | Feb. 8, 1949 |

FOREIGN PATENTS

| | | |
|---|---|---|
| 19,668 of 1909 | Great Britain | June 23, 1910 |

OTHER REFERENCES

Vacuum Technique, Dushman, 1949, QC 166 D 82, Scientific Library.